(12) United States Patent
Frobosilo et al.

(10) Patent No.: US 6,213,679 B1
(45) Date of Patent: Apr. 10, 2001

(54) DEFLECTION SLIDE CLIP

(75) Inventors: Raymond C. Frobosilo, Lido Beach; Ernest S. Viola, Huntington, both of NY (US)

(73) Assignee: Super Stud Building Products, Inc., Astoria, NY (US)

( * ) Notice: Subject to any disclaimer, the term of this patent is extended or adjusted under 35 U.S.C. 154(b) by 0 days.

(21) Appl. No.: 09/414,588

(22) Filed: Oct. 8, 1999

(51) Int. Cl.[7] .................................. F16B 9/00; E04H 9/02
(52) U.S. Cl. ............................ 403/403; 403/14; 403/231; 52/167.1; 52/713
(58) Field of Search ...................... 403/230, 231, 403/403, 3, 4, 13, 14, 205; 52/713, 715, 98, 167.1, 712, 714; 243/295.11, 298.1, 300

(56) References Cited

U.S. PATENT DOCUMENTS

| | | | | |
|---|---|---|---|---|
| 3,113,358 | * | 12/1963 | Zell et al. | 403/231 X |
| 3,490,797 | * | 1/1970 | Platte | 403/231 X |
| 4,035,093 | * | 7/1977 | Redshaw | 403/4 |
| 5,425,520 | * | 6/1995 | Masumoto | 403/231 X |
| 5,577,860 | * | 11/1996 | Plank | 403/403 |
| 5,642,641 | * | 7/1997 | Maxfield, Jr. et al. | 403/14 X |
| 5,720,571 | * | 2/1998 | Frobosilo et al. | 403/403 |
| 5,846,018 | * | 12/1998 | Frobosilo et al. | 403/403 |
| 6,138,425 | * | 10/2000 | Wendt | 403/403 X |

* cited by examiner

Primary Examiner—Harry C. Kim
(74) Attorney, Agent, or Firm—Clifford G. Frayne

(57) ABSTRACT

A deflection slide clip for use in metal curtain wall construction or metal frame wall construction providing for horizontal support of a laterally loaded stud while accommodating vertical slip and/or vertical and horizontal slip of the primary frame.

10 Claims, 6 Drawing Sheets

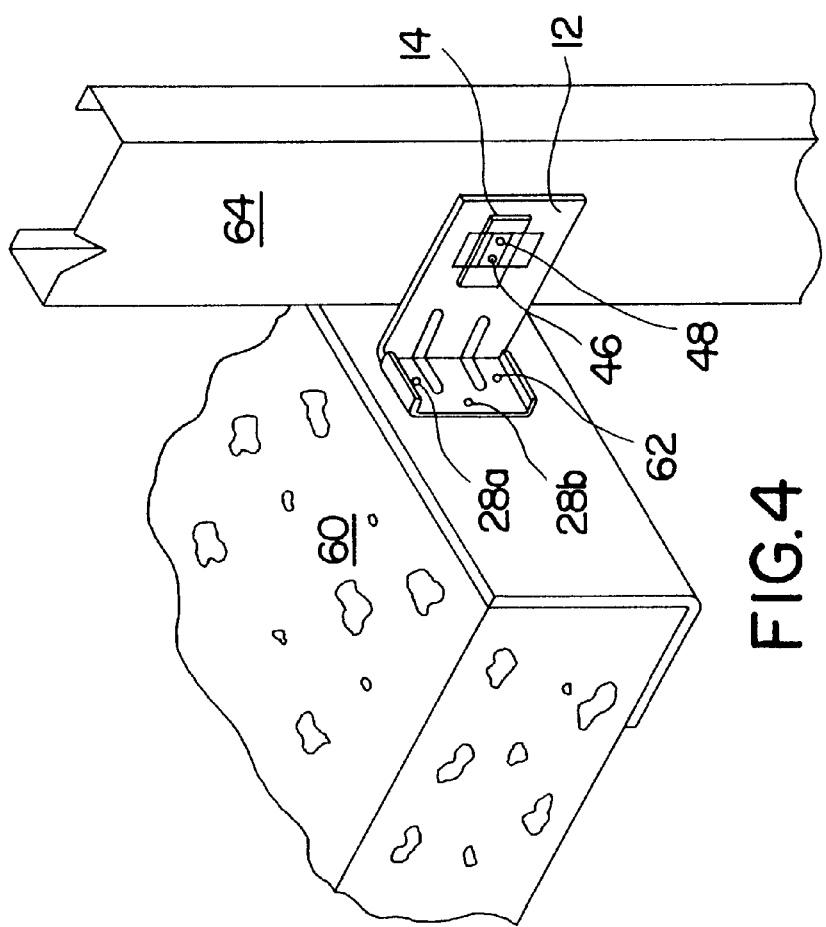
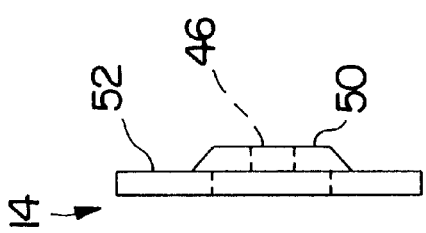
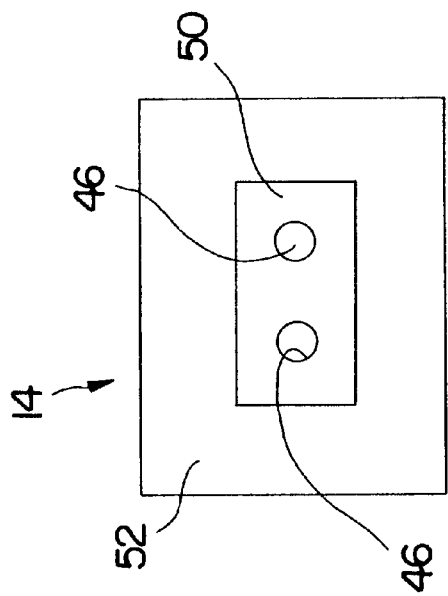

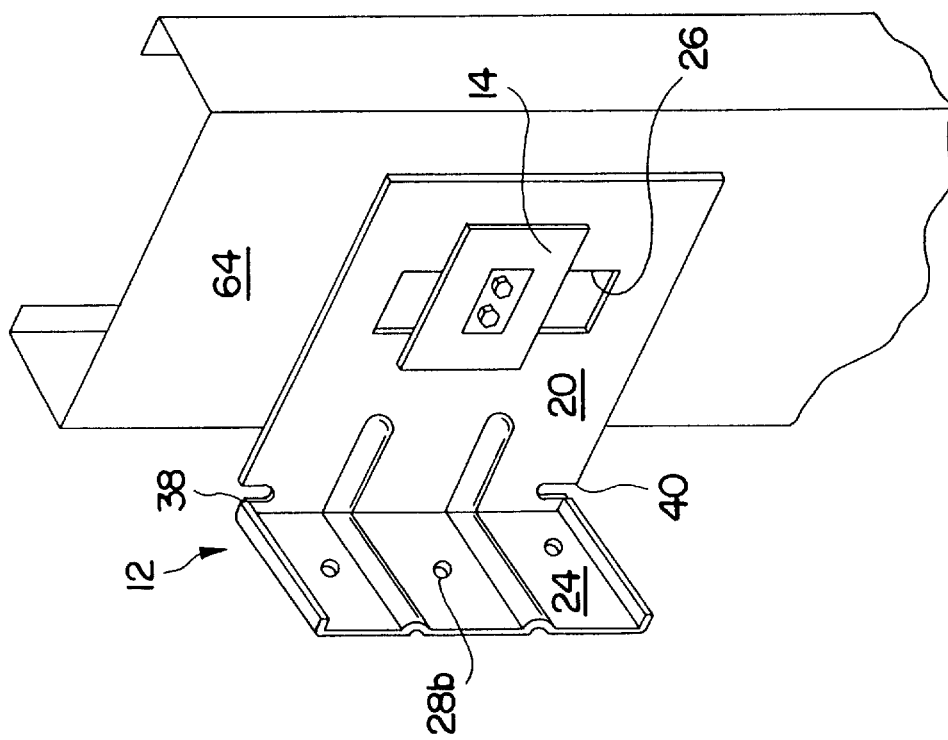
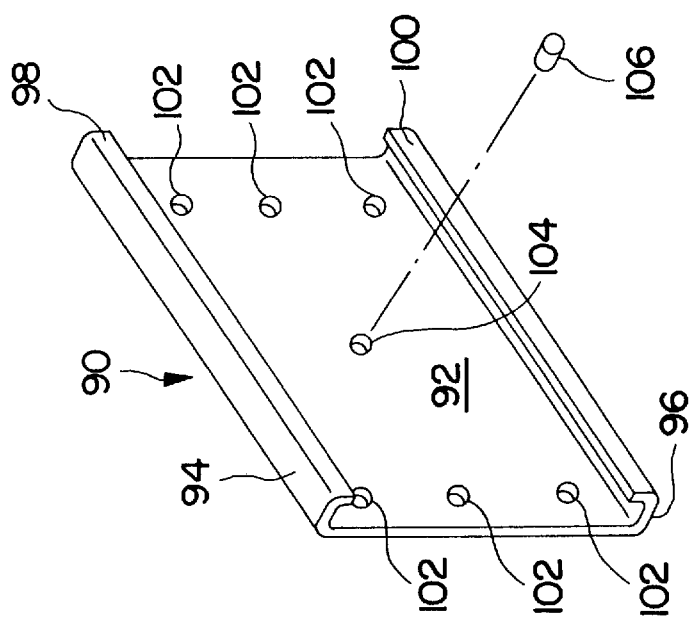
FIG. 5

DEFLECTION SLIDE CLIP

BACKGROUND OF THE INVENTION

1. Field of the Invention

The present invention pertains to a bracket for the structural metal construction industry which is commonly referred to as a deflection slide clip. More particularly the invention pertains to a deflection slide clip allowing for day-to-day vertical slip for uneven floor or roof edge profile for the attachment of a laterally loaded curtain wall stud or a wall stud and also, if desired, horizontal slip during a seismic event.

2. Description of the Prior Art

Traditional slide clips for exterior curtain walls require the installation of continuous support angles which must be accurately installed to provide for a vertical plumb and aligned wall. At best this connection requires the installation of slotted adjustable angles which require field attachment after they are placed in final position. At worst the angles attach out of position which requires the contractor to add short stud pieces to make the transition from stud to angle. Other clips do not provide the necessary off set required to accommodate the flange thickness of the stud and as a result, the clips are not installed flush to the surface of the support angle. As a result welds or mechanical fasteners are required to "bridge" the resulting gap and consequently, their holding values are not as predictable as those made when surface to surface contact is maintained.

The present invention provides a deflection slide clip for exterior curtain walls which accommodates for irregularities in the primary frame along the horizontal which also provides for a flush and direct mounting to the stud web and can accommodate vertical slip or both vertical and horizontal slip. It may also be used on interior walls as a stud header to accommodate vertical movement due to loading. The invention herein represents improvements over Applicant's prior invention as set forth in U.S. Pat. Nos. 5,846,018 and 5,720,571.

OBJECTS OF THE INVENTION

An object of the present invention is to provide a novel deflection slide clip which accommodates horizontal floor to stud misalignment.

Another object of the present invention is to provide for a novel deflection slide clip which eliminates joint play.

Another object of the present invention is to provide for a novel deflection slide clip which allows a direct and flush attachment to the web of a stud.

Another object of the present invention is to provide for a novel deflection slide clip which incorporates deformed stiffeners to increase lateral load carrying capacities.

Another object of the present invention is to provide for a novel deflection slide clip which may also provide for horizontal slip during a seismic event.

SUMMARY OF THE INVENTION

A deflection slide clip including an angle member, one leg of which is secured to the structure, the other leg having at least one slotted aperture for the slidable receipt therein of a slide plate, the slide plate having a plurality of apertures for the accommodation of a fastener means to secure the slide plate to a stud member of a wall or a curtain wall and therefore accommodate any movement between the structure and the wall or the curtain wall.

BRIEF DESCRIPTION OF THE DRAWINGS

These and other objects of the present invention and many attendant advantages of the present invention will be readily appreciated as the same becomes better understood by reference to the following detailed description when considered in connection with the accompanying drawings in which like reference numerals designate like parts throughout the figures thereof and wherein:

FIG. 2 is a side view of the second plate member of the deflection slide clip;

FIG. 3 is a rear view of the second plate member of the deflection slide clip; and FIG. 4 is a perspective view of the deflection slide clip mounted with relationship to a structure and a curtain wall stud.

FIG. 5 is a perspective exploded view of the deflection slide clip for accommodating horizontal slip during a seismic event.

DETAILED DESCRIPTION OF THE DRAWINGS

Figure 1:
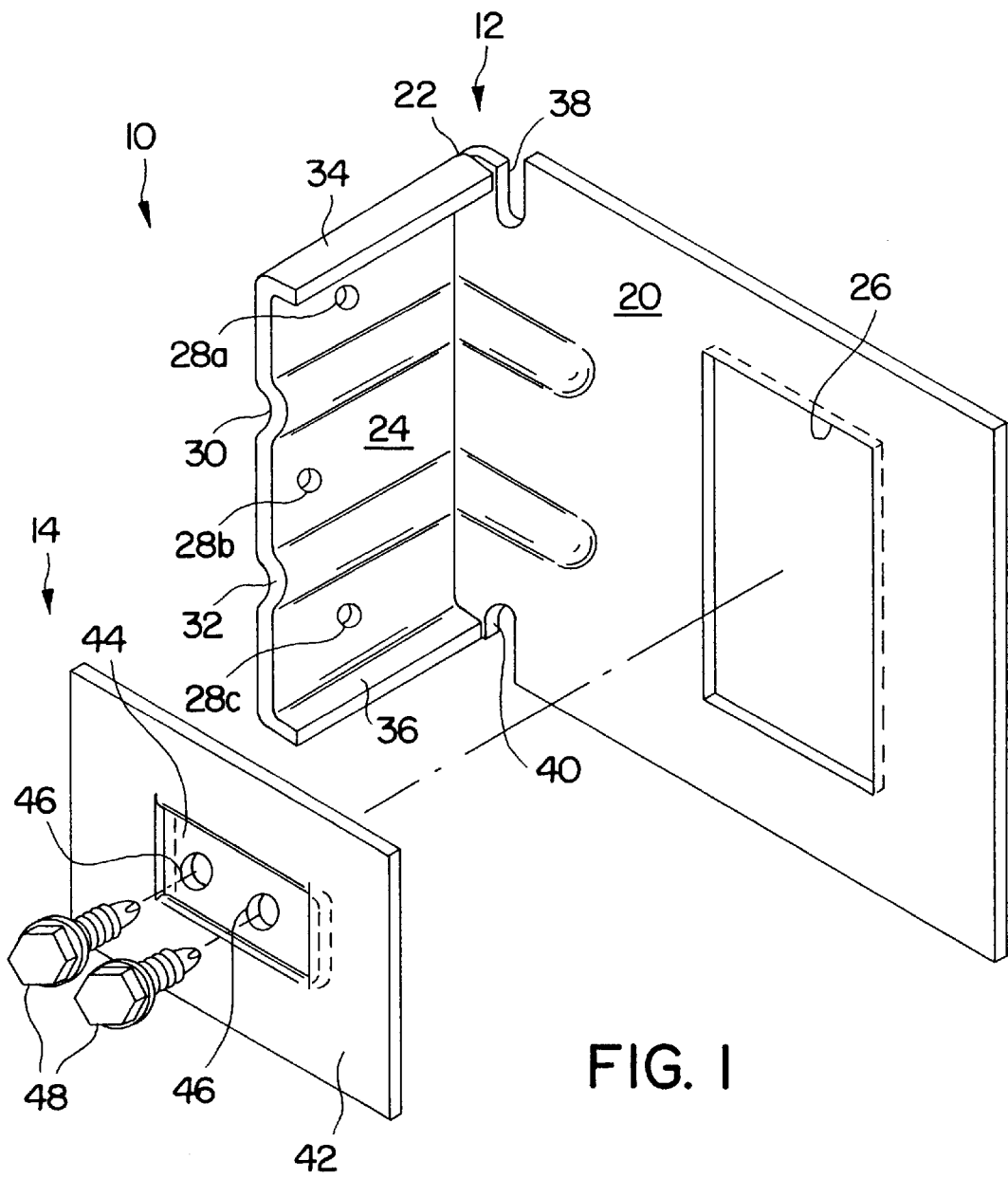
FIG. 1 is a perspective exploded view of the deflection slide clip of the present invention.

FIG. 1 illustrates a perspective, exploded view of deflection slide clip 10 hereinafter referred to as the slide clip. Slide clip 10 includes an angle member 12 and a slide plate member 14. Angle member 12 includes a planar member 20 bent at and aligned at a right angle about bend axis 22 to planar member 24. Planar member 24 includes a plurality of apertures 28a–28c suitable for attachment by various hardware means known in the art to the structure, be it a floor edge beam of the like, and illustrated hereafter. Planar member 20 includes a slotted aperture 26 cooperative with slide plate member 14 as described hereafter. Angle member 12 is also formed with deformed stiffeners 30 and 32 aligned horizontally along and between planar members 20 and 24 to increase the lateral load carrying capability of deflection slide clip 10.

Planar member 24 of angle member 12 also includes lip members 34 and 36 formed along the upper and lower lateral edges of planar member 24. Planar member 20 further includes U-shaped cut outs 38 and 40 on its upper and lower edges approximate to bend axis 22. The purpose of these lips and cut outs will be more further described with respect to FIGS. 5 and 6 hereafter.

Slide plate member 14 has a planar perimeter front surface portion 42 defining a centrally disposed recessed planar surface 44 formed by a mechanical punch means. The width of the recessed planar surface 44 of slide plate member 14 is dimensioned to allow its positioning in slotted aperture 26. Recess planar surface 44 has a plurality of apertures 46 therethrough to permit the passage therethrough of a fastening means 48 in order that slide plate member 14 may be secured to a curtain wall stud or wall stud. This particular configuration as illustrated in FIGS. 1–4 allows for the securing of the curtain wall stud to the main structure even if there is some misalignment between the contact point of the main structure and the vertical plumb of the curtain wall. Slide plate member 14 can be slidably vertically adjusted within slotted aperture 26 to correct for vertical plumb and then the fasteners 48 would be utilized to secure slide plate member 14 to the curtain wall stud. This same configuration also allows for a slidable relationship between the curtain wall and the main structure when subjected to loads.

FIGS. 2 and 3 further illustrate slide plate member 14 and the manner in which the front recessed planar surface 44 when formed by a machine punch forms a rear protruding planar surface 50 having a rear planar perimeter surface 52. The rear protruding planar surface 50 is slidably positionable within the slotted aperture 26. The rear protrusion planar surface 50 would be of a height slightly greater than the thickness of planar member 20 of angle member 12 thereby preventing slide plate member 14 from being dislodged from slotted aperture 26 by torque or twisting when the curtain wall is under wind load.

FIG. 4 is a prospective view illustrating the manner in which the deflection slide clip 10 would be mounted to a floor member 60 with fastener means 62 passing through the apertures 28 *a–c* in planar member 24 of angle member 12. The second set of fastening means 48 would be utilized to secure slide plate member 14 to a C-sectioned curtain wall stud 64 and thus position protruding planar surface 50 within slot 26 of planar member 20. This manner of construction allows for obtaining an accurate vertical plumb of curtain wall stud 64 and also allows for a certain amount of deflection between floor 60 and curtain wall stud 64 when floor 60 is under load such that there would be no deformation of the sheathing or outer surface of the building which would be secured to curtain wall stud 64. While FIG. 4 illustrates the use of the deflection slide clip 10 with respect to a curtain wall stud mounted directly to a floor member, the deflection slide clip 10 could similarly be secured to a steel frame member without departing from the spirit and scope of the invention.

Figure 6:
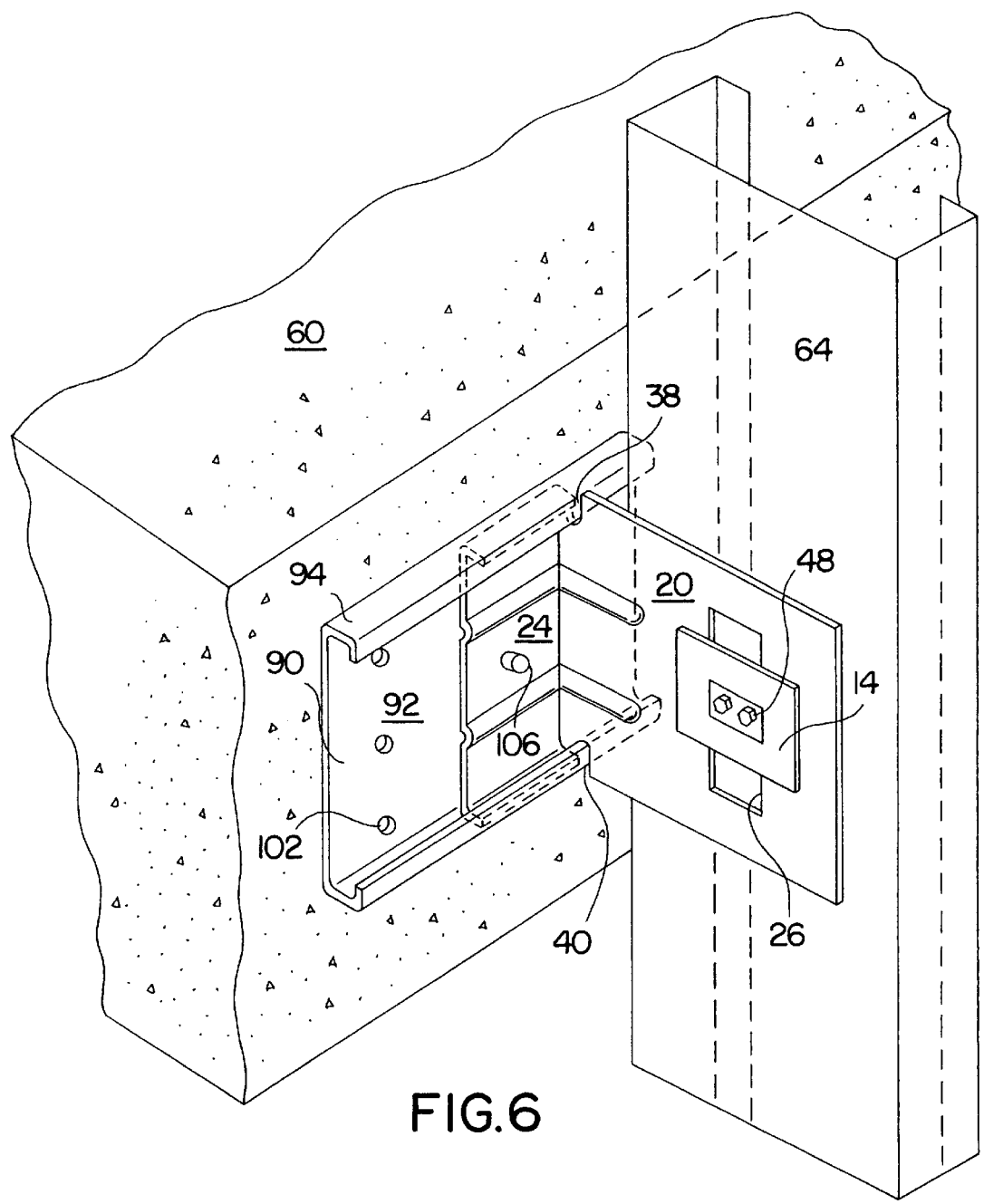
FIG. 6 is a perspective view of the deflection slide clip mounted in accordance with the second embodiment with the structure and a curtain wall stud to accommodate horizontal slip during a seismic event.

FIGS. 5 and 6 illustrate the deflection slide clip 10 with an additional mounting element which provides for not only vertical deflection between the floor and the curtain wall stud, but also can provide for horizontal deflection between the floor and the curtain wall stud which may be experienced during a seismic event.

The deflection slide clip 10 as illustrated in FIGS. 5 and 6 is identical to that heretofore discussed and the same reference numerals apply. The deflection slide clip 10 is enhanced for horizontal deflection by means of a bracket member 90, which is a planar member having a web portion 92, an upper flange portion 94 and a lower flange portion 96 depending from the same side of the web 92 and each having a turned in lip 98 and 100 respectively. Bracket member 90 is dimensioned such that planar member 24 of angle member 12 is slidably receivable within the channel defined by web 90, flanges 92 and 94 and lips 98 and 100. The U-shaped cut out portions 38 and 40 on planar member 20 of angle member 12 allow for planar member 24 of angle member 12 to be slidably insertable on bracket member 90 such that the lips 98 and 100 of bracket member 90 can slide freely through U-shaped cut outs 38 and 40.

Bracket member 90 has a plurality of apertures 102 which allow it to be secured to the floor or other structural member. Planar member 24 of angle member 12 is then slidably insertable as previously discussed and aperture 28*b* is aligned with a centrally disposed aperture 104 on web 92. A sheer pin 106 is then frictionally positioned through aperture 26*b* and into aperture 106. Sheer pin 106 positions angle member 12 with respect to bracket member 90. The curtain wall stud would then be positioned and secured as heretofore discussed. In this configuration, there is provided both vertical and horizontal deflection. The vertical deflection is accomplished as heretofore discussed and the horizontal deflection is permitted by means of the sheer pin 106 and the positioning of planar member 24 of angle member 12 within the slot defined by bracket member 90. In the event of a seismic event sufficient to cause horizontal deflection, the sheer pin 106 will break and allow planar member 24 of angle member 12 to deflect horizontally within the slot of bracket member 90 and thus prevent or limit any displacement of the sheathing or outer covering of the building supported by the curtain wall stud.

Figure 7:
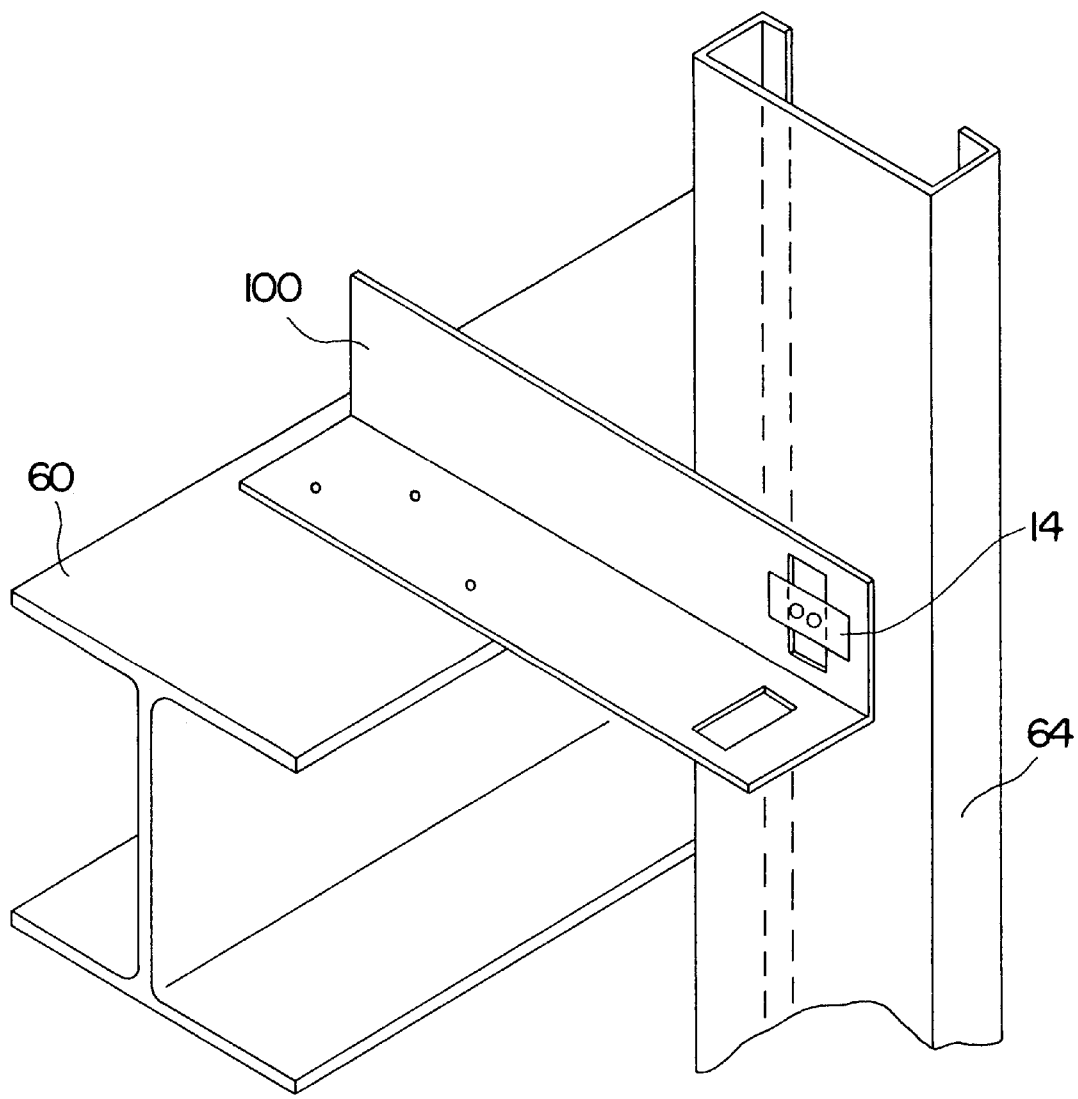
FIG. 7 is a perspective view of an alternative embodiment of FIG. 1.

In certain instances, the construction will dictate that compensation for vertical movement of a curtain wall must be provided for at a greater distance from the frame of the building and a more rigid, steel structural element must be secured to the frame to support the curtain wall. FIG. 7 illustrates such a situation in which a structural member 100 is secured to the frame of the building 60 which in this instance is illustrated by an I-beam. In such a situation, structural member 100 can be formed with slotted apertures in accordance with the teachings with respect to FIGS. 1–4 of the present invention and the slide plate member 14 can be utilized in conjunction with these slotted apertures and structural member 100 to secure and provide for vertical movement of curtain wall stud 64.

The present invention in FIGS. 1–7 has been illustrated with respect to a mounting method in which the slotted aperture 26 formed in a planar member 20 has been in a vertical orientation with respect to planar member 20 so as to permit the vertical movement of a curtain wall. A deflection slide clip can also be used so as to provide for the vertical deflection on interior wall studs between floors or between a floor and a roof. These instances, the deflection slide clip would perform in accordance with the teachings associated with FIGS. 1–4 however the slotted aperture would be oriented differently.

Figure 8:
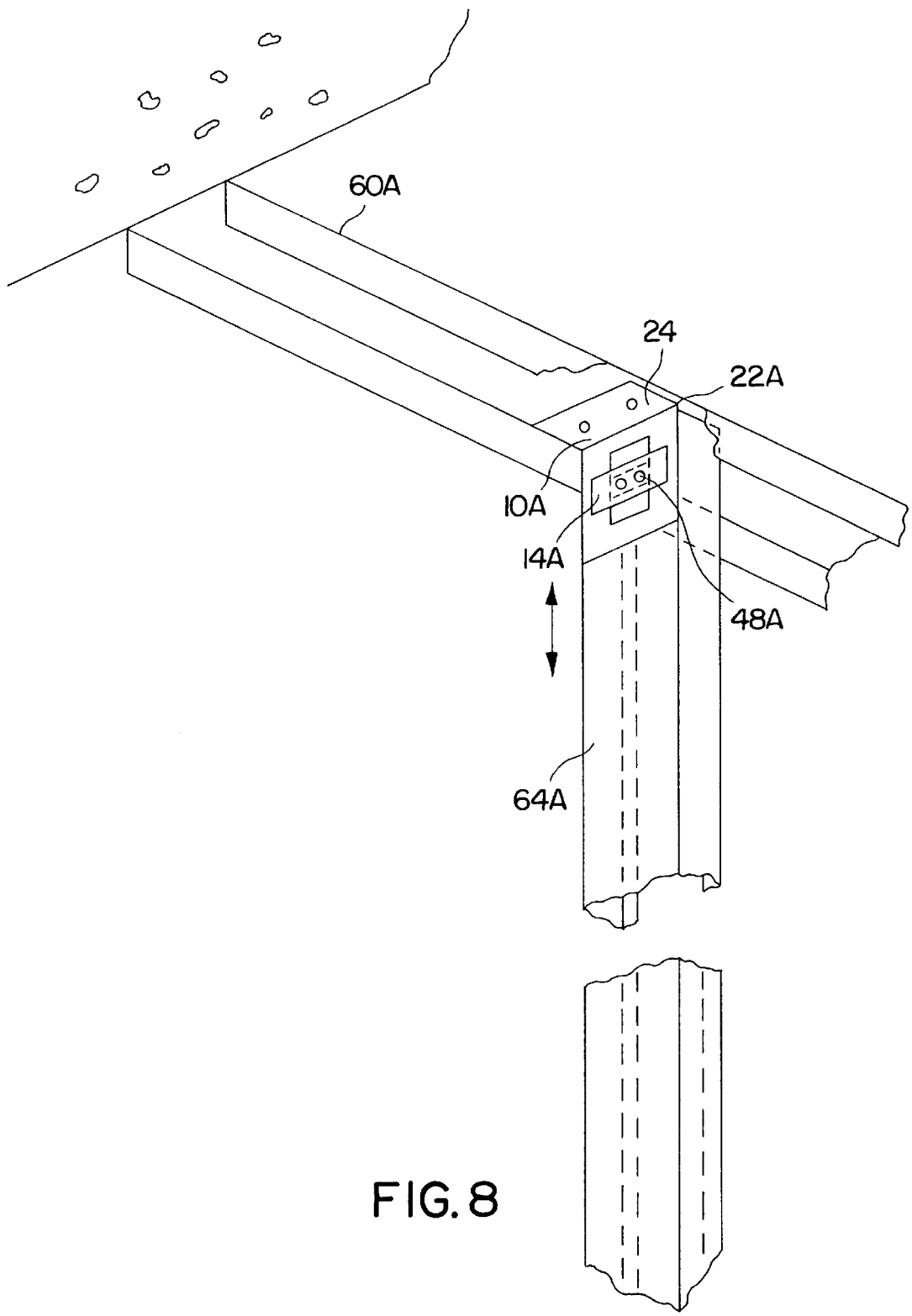
FIG. 8 is a perspective view a deflection slide clip of the current invention utilized as a header for an interior wall stud.

Referring to FIG. 8 there is illustrated a perspective view of a deflection slide clip 10A mounted to the underside of a roof or floor member 60A and being secured to a wall stud 64A. In this configuration, the attachment remains identical to that described with respect to FIGS. 1–4 with planar member 24 having a plurality of apertures for securing it to the underside of the floor or roof member 60A. The slotted aperture in this configuration is oriented vertically but is perpendicular to the bend axis 22A of angle member 12 whereas in the utilization of the deflection slide clip with respect to exterior curtain walls, the slotted aperture is vertically oriented but is parallel to the bend axis 22. In the configuration illustrated in FIG. 8, slide plate member 14A is positioned within the slotted aperture and secured to the C-section stud member 64A by fastening means 48A. In this configuration, compensation is provided for vertical movement should there be deflection of the upper floor 60A such that the interior walls for which C-section stud 64A is a part, do not become misaligned, twisted or displaced.

The embodiment illustrated in FIG. 8 is with respect to a C-section stud member which would be the equal of a standard 2×4 in the lumber construction trades. As such, a single slotted aperture is normally sufficient to suffice so as to provide for the vertical movement compensation. However, if the C-section stud member were increased in size, such as to a 2×6 or 2×10 equivalent to the lumber construction trades, then and in that event, vertical movement could be compensated for by one or more slotted apertures formed in planar member 24A, each having their own associated slide plate member 14A and secured in the manner heretofore described.

While the present invention has been described with respect to the exemplary embodiments thereof, it will become apparent to one of ordinary skill in the art that many modifications can be made without departing from the spirit and scope of the invention and therefore it is manifestly intended the scope of the invention be limited only by the claims and the equivalence thereof.

We claim:

1. A deflection slide clip comprising:

an angle member comprising a first planar member and a second planar member at a substantial right angle, said first planar member and said second planar member having an inner surface and an outer surface, said first planar member having a slotted aperture therethrough, said second planar member having at least one aperture therethrough for receipt of a securing means for mounting said angle member;

a slide plate member having a first side and a second side, said slide plate member formed with a centrally disposed punch portion forming a depressional deformation on said first side and a centrally disposed protrusion on said second side, said centrally disposed protrusion slidably receivable within said slotted aperture of said first planar member of said angle member, said centrally disposed punch portion of said plate member having at least one aperture therethrough for receipt of a fastening means.

2. The deflection slide clip in accordance with claim 1 wherein said slotted aperture is vertical in elongation on said first planar member of said angle member.

3. The deflection slide clip in accordance with claim 1 wherein said slotted aperture is horizontal in elongation on said first planar member of said angle member.

4. The deflection slide clip in accordance with claim 1 including at least one deformed stiffener in said first and second planar members of said angle member.

5. The deflection slide clip in accordance with claim 1 wherein said second planar member is formed with horizontally extending flanges.

6. The deflection slide clip in accordance with claim 1 further including a horizontal movement plate member for the slidable receipt of said second planar member of said angle member, said horizontal movement plate member having a plurality of apertures therethrough for affixing said horizontal movement plate member.

7. The deflection slide clip in accordance with claim 6 wherein said first planar member is formed with U-shaped cut outs proximate said substantially right angle of said angle member permitting said slidable receipt of said second planar member with said horizontal movement plate member.

8. The deflection slide clip in accordance with claim 7 wherein said second planar member is slidably securable within said horizontal movement plate member.

9. The deflection slide clip in accordance with claim 7 wherein said horizontal movement plate member has a securing means positioned thereon cooperative with said second planar member, said securing means for positionally locking said second planar member in relationship with said horizontal movement plate member.

10. The deflection slide clip of claim 7 wherein said securing means comprises a shear pin.

\* \* \* \* \*